United States Patent
Tsuruoka

(10) Patent No.: US 8,694,045 B2
(45) Date of Patent: Apr. 8, 2014

(54) RADIO COMMUNICATION APPARATUS AND TRANSMISSION POWER CONTROL METHOD HAVING FIRST RETRANSMISSION PHASE AND SECOND RETRANSMISSION PHASE

(75) Inventor: Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 289 days.

(21) Appl. No.: 13/151,442

(22) Filed: Jun. 2, 2011

(65) Prior Publication Data

US 2011/0300895 A1 Dec. 8, 2011

(30) Foreign Application Priority Data

Jun. 4, 2010 (JP) ................................. 2010-129141

(51) Int. Cl.
*H04B 7/00* (2006.01)

(52) U.S. Cl.
USPC .............. 455/522; 455/9; 455/15; 455/69; 455/41.2; 455/423; 455/452.1; 370/315; 370/329

(58) Field of Classification Search
USPC .............. 455/522, 7, 9, 15, 68, 69, 41.2, 423, 455/450, 452.1; 370/208, 278, 315, 329, 370/516
See application file for complete search history.

(56) References Cited

U.S. PATENT DOCUMENTS

| 4,083,047 A * | 4/1978 | Schalow .......................... 342/46 |
| 7,570,968 B2 | 8/2009 | Huh et al. |
| 2008/0045147 A1* | 2/2008 | Okuda ............................ 455/15 |
| 2011/0292881 A1* | 12/2011 | Li et al. ........................ 370/328 |

FOREIGN PATENT DOCUMENTS

| JP | 2007-519327 A | 7/2007 |
| JP | 2009-071585 A | 4/2009 |

* cited by examiner

*Primary Examiner* — Shaima Q Aminzay
(74) *Attorney, Agent, or Firm* — Fujitsu Patent Center

(57) ABSTRACT

A radio communication apparatus including: a radio interface; and a processor configured to control the radio interface to transmit a Ranging signal to a base station and to control a transmission power level of the Ranging signal; when the processor controls the radio interface to retransmit the Ranging signal, the retransmission includes a first phase and a second phase, the first phase in which the processor controls the radio interface to retransmit the Ranging signal at substantially a same transmission power level as at the time of initial transmission, or performs substantially a same calculation as that made at the time of the initial transmission of the Ranging signal and retransmits the Ranging signal at the calculated transmission power level, the second phase in which the processor increases the transmission power level and retransmits the Ranging signal at the increased transmission power level.

12 Claims, 14 Drawing Sheets

RADIO COMMUNICATION APPARATUS AND TRANSMISSION POWER CONTROL METHOD HAVING FIRST RETRANSMISSION PHASE AND SECOND RETRANSMISSION PHASE

CROSS-REFERENCE TO RELATED APPLICATION

This application is based upon and claims the benefit of priority from the prior Japanese Patent Application No. 2010-129141 filed on Jun. 4, 2010, the entire contents of which are incorporated herein by reference.

FIELD

The present invention relates to a radio communication apparatus and a transmission power control method.

BACKGROUND

Radio communication systems employing the Institute of Electrical and Electronics Engineers (IEEE) 802.16e known as the Worldwide Interoperability for Microwave Access (WiMAX) that uses the Orthogonal Frequency Division Multiple Access (OFDMA) as a radio communication technique have been developed.

FIG. 14 is a diagram illustrating a WiMAX radio communication system. In a WiMAX radio access network 100, base stations 101 to 103 and a gateway 104 are connected. Radio communication is performed between the base stations 101 to 103 and mobile stations 31 and 32. The gateway 104 is a node used to connect networks compliant with different protocols, and is disposed in an upper-level carrier building or the like.

In the above-described radio communication system, a base station receives a frame in which radio waves from a plurality of mobile stations are mixed. Accordingly, in order to prevent the saturation of a receiving level and the lack of a noise margin in the base station, it is required that the levels of radio waves from the mobile stations be substantially the same. The mobile stations perform transmission power control.

On the other hand, the base station performs access control processing for individually assigning communication slots, which are arranged in a time direction (symbol direction) and a frequency direction (subcarrier frequency direction), to the mobile stations. As a result, communication is performed between the base station and each of the mobile stations.

When a mobile station has no communication slot, the mobile station transmits a Code Division Multiple Access (CDMA) Ranging code (hereinafter merely referred to as a Ranging) defined in the WiMAX protocol specification (IEEE 802.16e or the subsequent standard) to a base station with a dedicated transmission slot. The base station receives the Ranging as a communication access request from the mobile station.

As a transmission power control technique in the related art, a technique for determining the power of transmission of an uplink frame from a subscriber terminal to a base station is disclosed in Japanese Unexamined Patent Application Publication No. 2007-519327. A technique for detecting the level value of a received signal on the basis of a Ranging transmitted from a mobile terminal, comparing the detected level value with a control target value, and generating a control command used to adjust the transmission output of the mobile terminal on the basis of a result of the comparison is disclosed in Japanese Unexamined Patent Application Publication No. 2009-71585.

SUMMARY

According to an aspect of the invention, a radio communication apparatus including: a radio interface configured to transmit or receive a radio signal; and a processor configured to control the radio interface to transmit a Ranging signal to a base station and to control a transmission power level of the Ranging signal; when the processor controls the radio interface to retransmit the Ranging signal, the retransmission of the Ranging signal includes a first phase and a second phase, the first phase in which the processor controls the radio interface to retransmit the Ranging signal at substantially a same transmission power level as at the time of initial transmission of the Ranging signal, or performs substantially a same calculation as that made at the time of the initial transmission of the Ranging signal and retransmits the Ranging signal at the calculated transmission power level, the second phase in which the processor increases the transmission power level and retransmits the Ranging signal at the increased transmission power level.

The object and advantages of the invention will be realized and attained by at least the elements, features, and combinations particularly pointed out in the claims. It is to be understood that both the foregoing general description and the following detailed description are example and explanatory and are not restrictive of the invention, as claimed.

DESCRIPTION OF EMBODIMENTS

In the above-described case, a Ranging is transmitted from a mobile station to a base station with a transmission slot capable of providing a large receiving margin for the base station. The transmission of a Ranging means that the mobile station does not have a communication right.

Accordingly, power used to transmit a Ranging from the base station to the mobile station may be changed to an inappropriate level owing to a radio wave environment or a disturbance (for example, the passage of a person or an object across a communication path or the presence of a reflector) around the mobile station. In this case, the Ranging may not reach the base station, or may be incorrectly transmitted to the base station.

When the mobile station receives no response from the base station after transmitting the Ranging to the base station, it retransmits the Ranging (performs a retry). However, it is difficult for the mobile station to determine the reason why there is no response from the base station. For example, reasons may be the shortage of transmission power in the mobile station, unsuccessful receiving in the base station or the mobile station due to a temporary interference or the disturbance of a radio wave, or unsuccessful receiving in the base station due to the temporary increase in processing load on the base station.

Accordingly, when the mobile station makes a retry, it cannot transmit the Ranging at an appropriate transmission power level. The mobile station may repeatedly perform a retry at an inappropriate transmission power level until the base station receives the Ranging and communication between the base station and the mobile station is established. This leads to the reduction in operational efficiency and the deterioration in communication quality.

It is an object of the present invention to provide a radio communication apparatus capable of improving operational efficiency and communication quality by performing the retransmission of a Ranging at an appropriate transmission power level.

It is another object of the present invention to provide a transmission power control method capable of improving operational efficiency and communication quality by performing the retransmission of a Ranging at an appropriate transmission power level. It is still another object of the present invention to provide a transmission power control program capable of improving operational efficiency and communication quality by causing a computer to perform the retransmission of a Ranging at an appropriate transmission power level.

Figure 1:
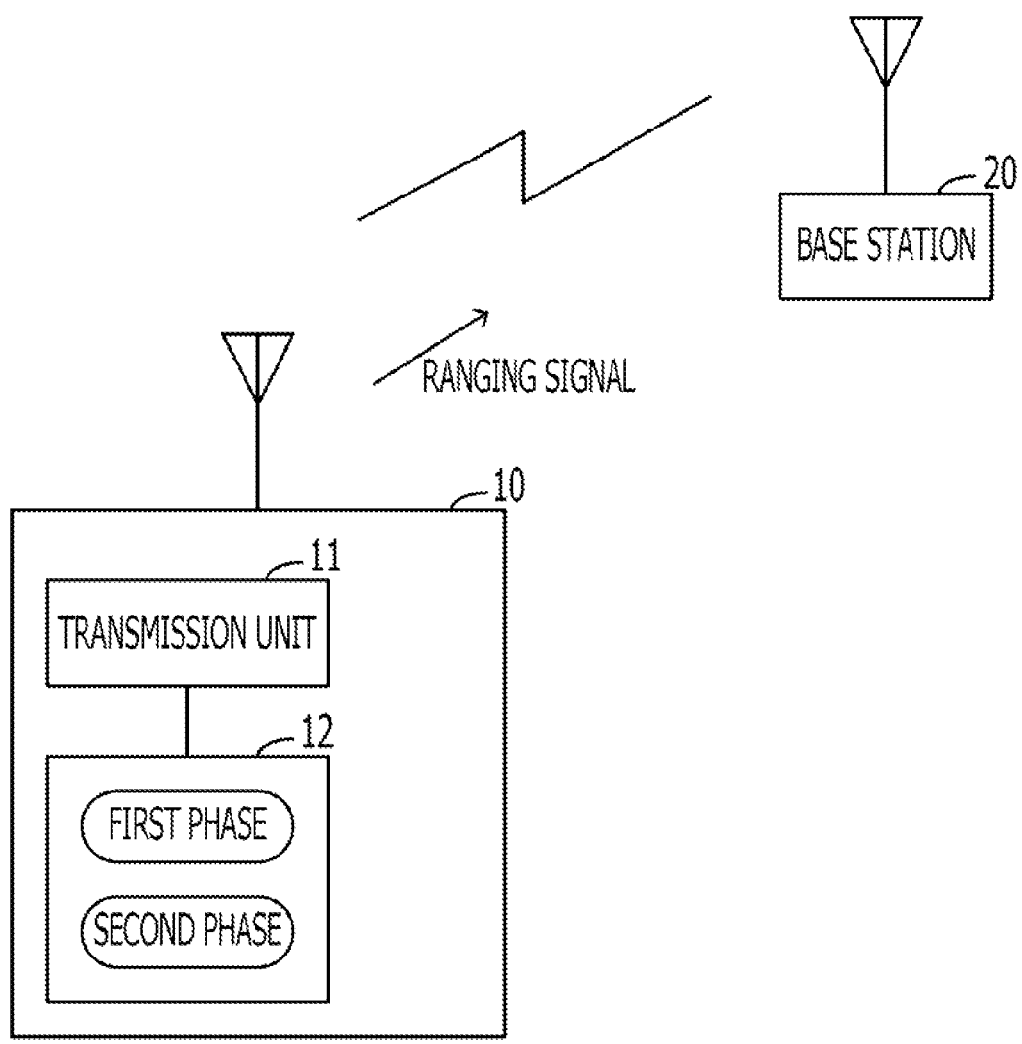
FIG. 1 is a diagram illustrating an example configuration of a radio communication apparatus.

Embodiments of the present invention will be described below with reference to the accompanying drawings. FIG. 1 is a diagram illustrating an example configuration of a radio communication apparatus. A radio communication apparatus 10 includes a transmission section 11 for transmitting a Ranging signal to a base station 20 and a transmission power control section 12 for controlling the transmission power level of the Ranging signal.

The transmission power control section 12 retransmits a Ranging signal in two phases. In the first phase, there are two patterns of retransmitting a Ranging signal. One of them is retransmitting a Ranging signal at substantially the same transmission power level as that used at the time of initial transmission of the Ranging signal. The other one of them is performing substantially the same transmission power level calculation as that made at the time of initial transmission of the Ranging signal and retransmitting the Ranging signal at the calculated transmission power level.

In the second phase, a transmission power level is variably increased and the Ranging signal is retransmitted at the increased transmission power level. In the following description, a Ranging signal and retransmission are referred to as a Ranging and retry, respectively.

Before the radio communication apparatus 10 is described in detail, a case in which the retry of a Ranging is performed at an inappropriate transmission power level will be described. When a mobile station that has transmitted a Ranging to a base station receives no response from the base station and performs the retry of the Ranging at an increased transmission power level, the increased transmission power level may deviate from an appropriate transmission power level depending on the Received Signal Strength Indication (RSSI).

Figure 2:
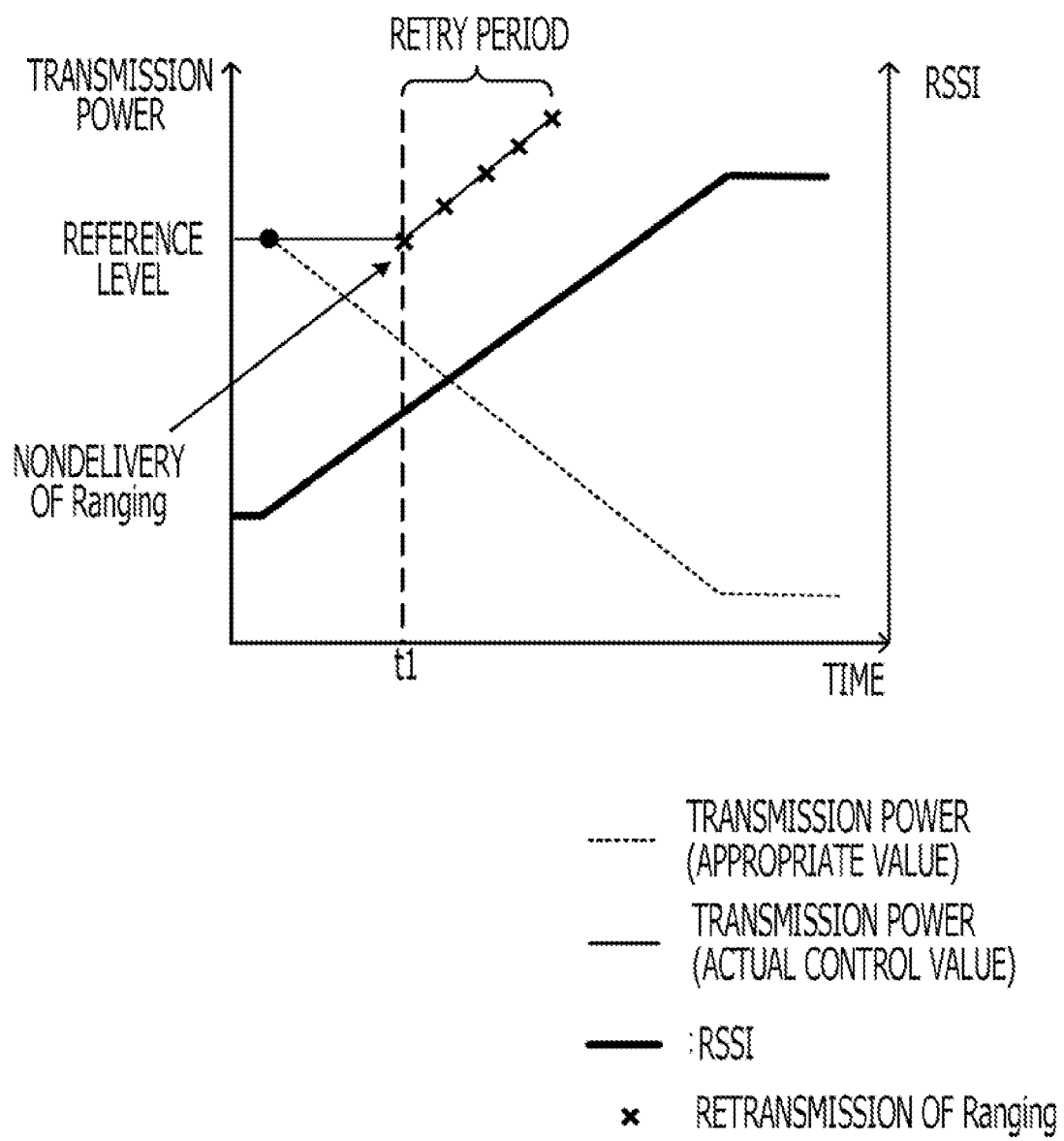
FIG. 2 is a diagram illustrating an example case in which transmission power exceeds an appropriate transmission power level.

FIG. 2 is a diagram illustrating an example case in which transmission power exceeds an appropriate transmission power level. Referring to FIG. 2, a horizontal axis, a left vertical axis, and a right vertical axis represent time, transmission power, and RSSI, respectively. The path loss between a base station and a mobile station decreases with the increase in RSSI, because the receiving environment of the mobile station is improved with the increase in RSSI. Accordingly, an appropriate Ranging transmission power is generally reduced from a reference level.

At a time t1, it is assumed that the mobile station cannot receive a response to a Ranging from the base station owing to a factor such as a temporary disturbance other than a power factor (for example, the shortage of transmission power). In this case, a mobile station in the related art periodically increases transmission power having a db value at the time of the retry of a Ranging.

As a result, despite the fact that RSSI increases and a reference level is an adequate Ranging transmission power level, a Ranging transmission power level exceeds an appropriate transmission power level and deviates from the appropriate transmission power level owing to the simple periodic increase in the Ranging transmission power level.

When the transmission power reaches the maximum receiving level of the base station, the mobile station performs the retry again starting from the minimum transmission power level so as to search for an appropriate transmission power level. Accordingly, a timeout occurs or the mobile station must perform the retry for a long period before receiving a response.

Figure 3:
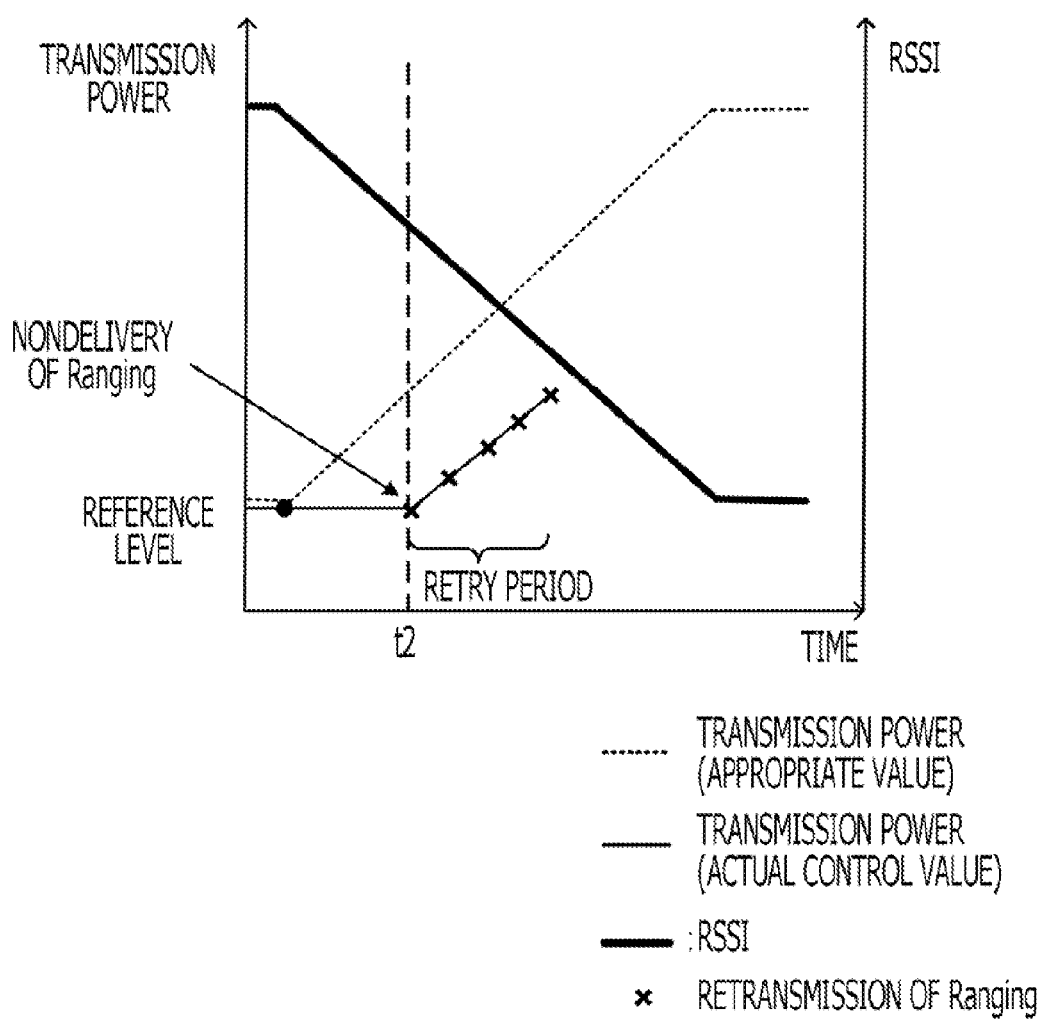
FIG. 3 is a diagram illustrating an example case in which transmission power is under an appropriate transmission power level.

FIG. 3 is a diagram illustrating an example case in which transmission power is under an appropriate transmission power level. Referring to FIG. 3, a horizontal axis, a left vertical axis, and a right vertical axis represent time, transmission power, and RSSI, respectively. The path loss between a base station and a mobile station increases with the decrease in RSSI, because the receiving environment of the mobile station is degraded with the decrease in RSSI. Accordingly, an appropriate Ranging transmission power is generally increased from a reference level.

At a time t2, it is assumed that the mobile station cannot receive a response to a Ranging from the base station owing to a power factor. Like in the above-described case, in this case, a mobile station in the related art periodically increases transmission power at the time of the retry of the Ranging.

At that time, the mobile station may rapidly move, a receiving environment may be significantly degraded, and the amount of required transmission power may be significantly increased. In this case, even if the mobile station performs simple periodic increase in the transmission power level, the transmission power level cannot reach an appropriate transmission power level quickly. Accordingly, after the receiving environment has been degraded, the mobile station cannot receive a radio wave and the disconnection between the mobile station and the base station may occur.

It is an object of the present invention to keep transmission power at an appropriate level by controlling the transmission power at the time of retry of a Ranging and improve operational efficiency and communication quality.

Figure 4:
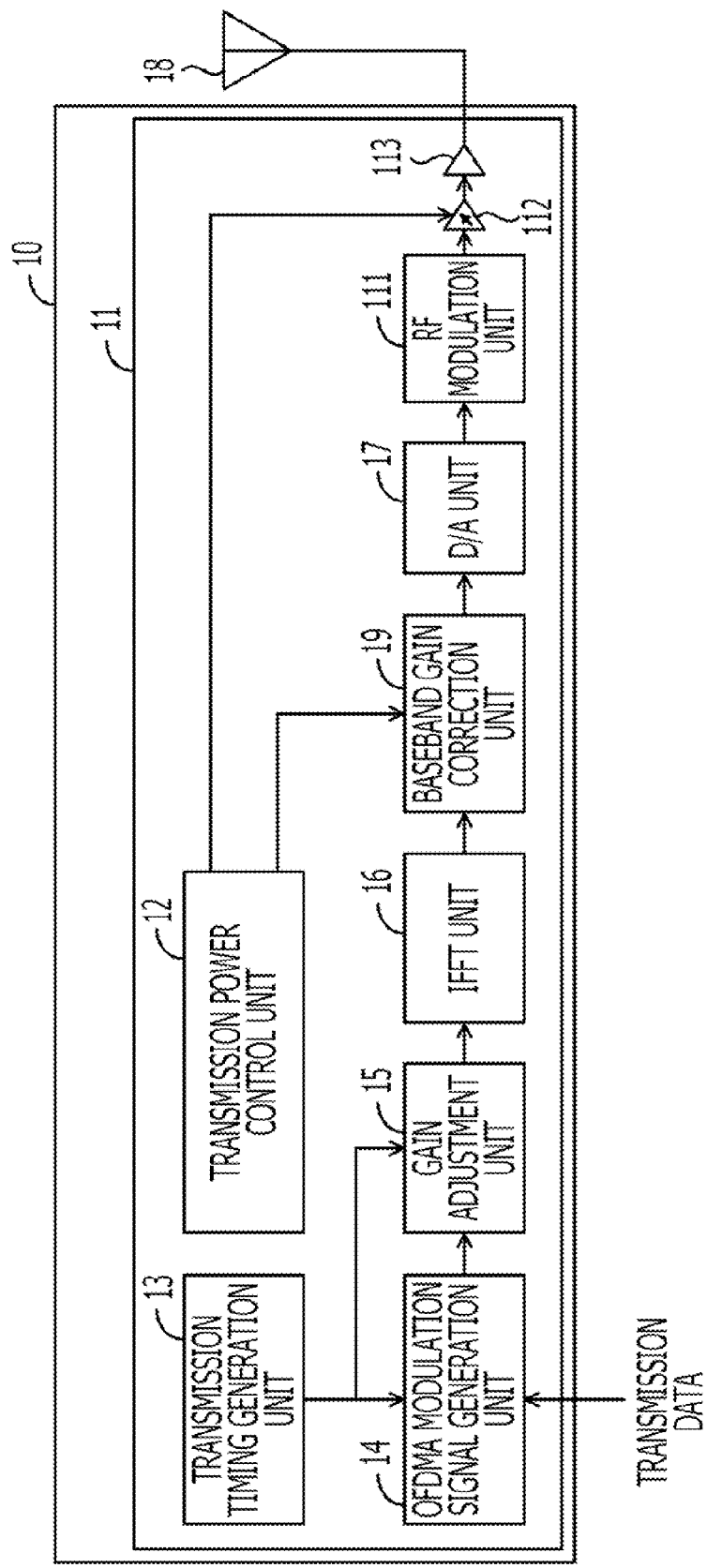
FIG. 4 is a diagram illustrating an example configuration of a radio communication apparatus.

Next, the configuration and operation of the radio communication apparatus 10 will be described. FIG. 4 is a diagram illustrating an example configuration of the radio communication apparatus 10. The radio communication apparatus 10 includes the transmission section 11, the transmission power control section 12, and a transmission timing generation section 13. The transmission section 11 includes an OFDMA modulation signal generation unit 14, a gain adjustment unit 15, an Inverse Fast Fourier Transform (IFFT) unit 16, a baseband gain correction unit 19, a digital-to-analog (D/A) unit 17, an RF modulation unit 111, a variable amplifier 112, a power amplifier 113, and an antenna 18.

The transmission timing generation section 13 determines a time of transmission of a transmission frame. The OFDMA modulation signal generation unit 14 performs OFDMA modulation on transmission data on the basis of the transmission time so as to generate an OFDMA modulation signal. The gain adjustment unit 15 adjusts the gain of the OFDMA modulation signal for each subcarrier on the basis of the transmission time.

The IFFT unit 16 performs IFFT computation on a signal output from the gain adjustment unit 15. The baseband gain correction unit 19 corrects the transmission power of a transmission signal that has been subjected to the IFFT computation. The D/A unit 17 converts a digital signal into an analog signal. The RF modulation unit 111 upconverts a signal output from the D/A unit 17. The upconverted signal is amplified by the variable amplifier 112 and the power amplifier 113 and is then transmitted to the base station 20 via the antenna 18. The transmission power control section 12 adjusts the gains of the baseband gain correction unit 19 and the variable amplifier 112 so that desired outputs are obtained.

Next, a closed-loop control method and an open-loop control method, which are representative transmission power loop control methods, will be described.

In the closed-loop control method, a mobile station controls transmission power in accordance with an instruction from a base station. In the open-loop control method, a mobile station autonomously controls transmission power on the basis of the receiving level of a radio wave transmitted from a base station.

Figure 5:
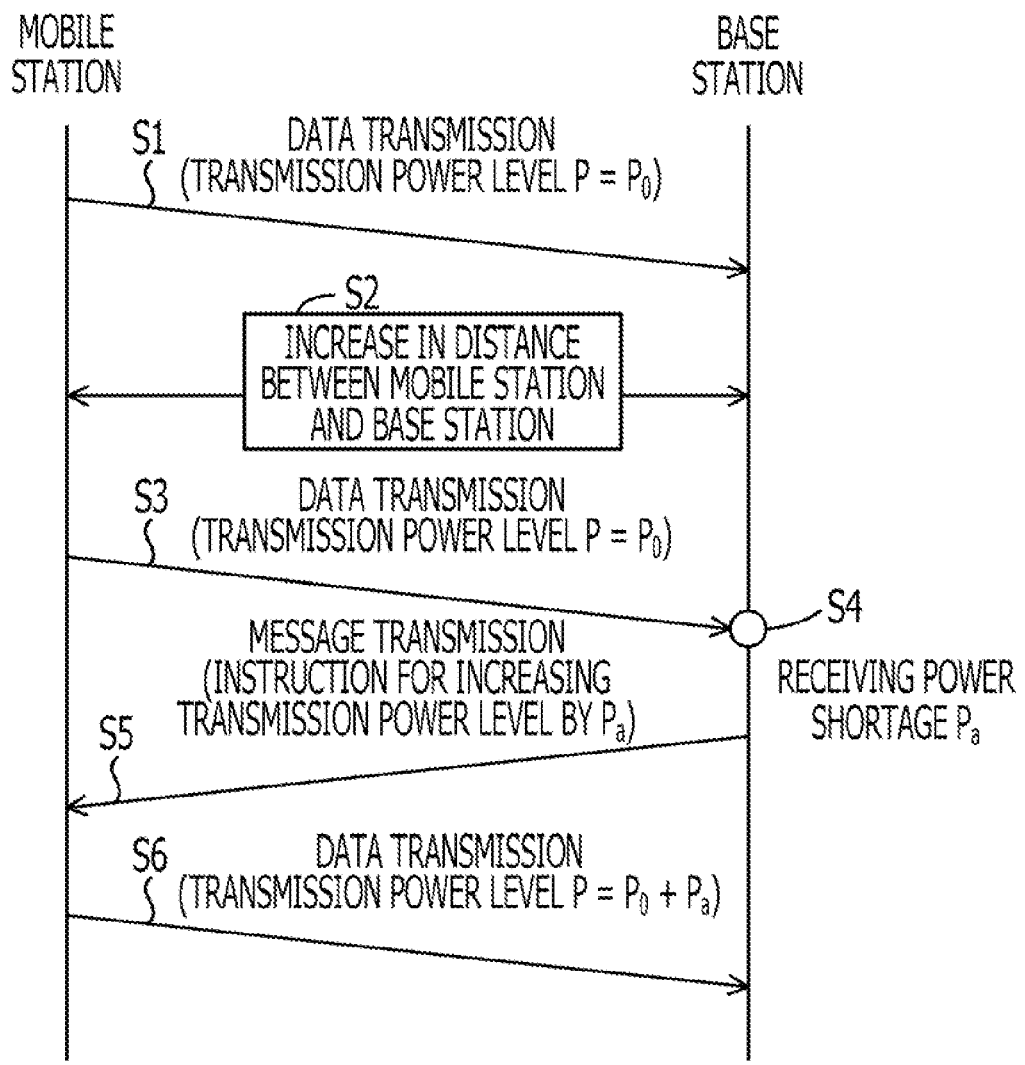
FIG. 5 is a sequence diagram illustrating an example closed-loop control process.

FIG. 5 is a sequence diagram illustrating an example closed-loop control process.

[S1] A mobile station performs data transmission at a transmission power level $P_0$.

[S2] The mobile station moves apart from a base station.

[S3] Like in operation S1, the mobile station transmits data at the transmission power level $P_0$.

[S4] The base station finds a receiving power level to be a power level $P_a$ short.

[S5] The base station transmits a message including an instruction for increasing the transmission power level by the power level $P_a$ to the mobile station.

[S6] Upon receiving the message, the mobile station increases the transmission power level by the power level $P_a$ and transmits data at a transmission power level $(P_0+P_a)$.

Thus, in the closed-loop control, a mobile station does not autonomously perform power control. When a base station recognizes the need to perform power control after, for example, the distance between the mobile station and the base station has been changed, the base station transmits a transmission power control instruction to the mobile station.

Figure 6:
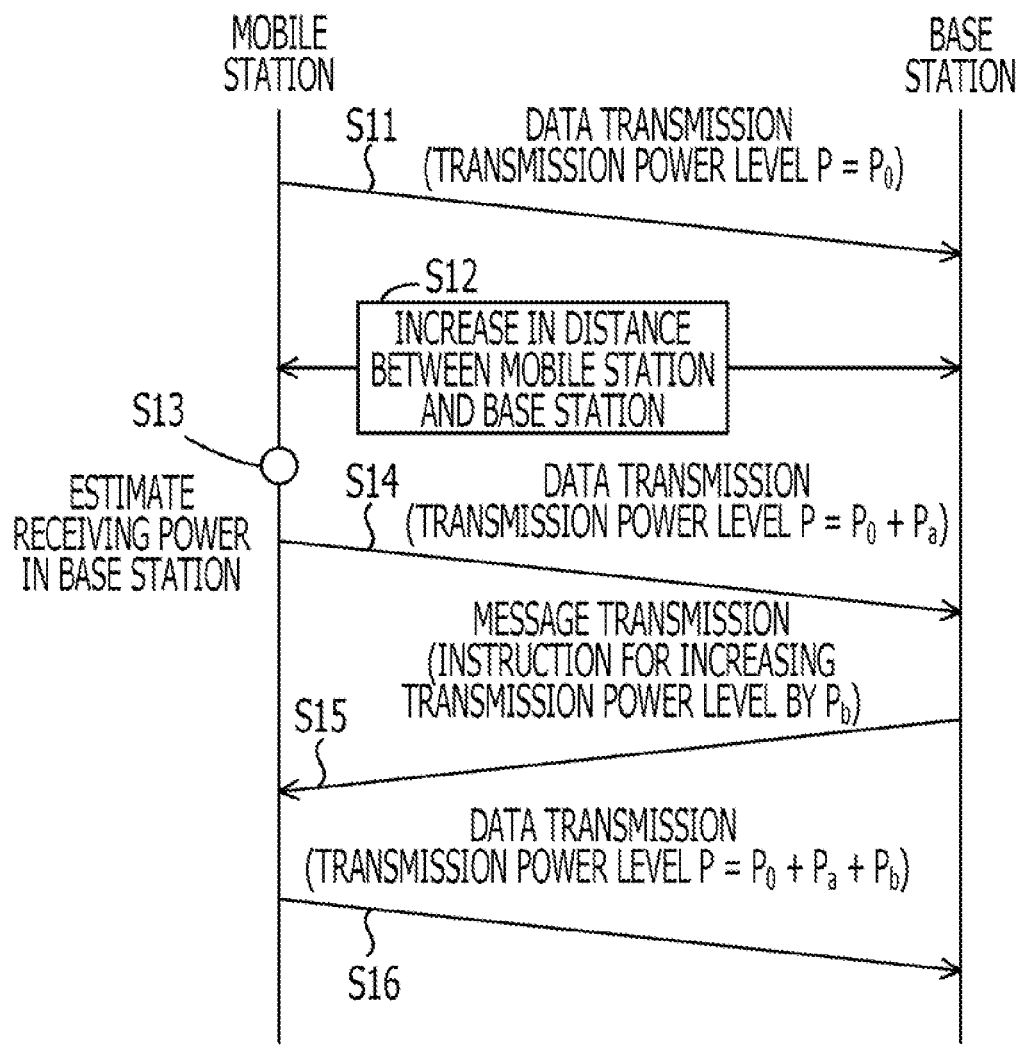
FIG. 6 is a sequence diagram illustrating an example open-loop control process.

FIG. 6 is a sequence diagram illustrating an example open-loop control process.

[S11] A mobile station performs data transmission at a transmission power level $P_0$.

[S12] The mobile station moves apart from a base station.

[S13] The mobile station estimates receiving power required for the base station.

[S14] It is assumed that the mobile station determines that the transmission power level is to be increased by a power level $P_a$. The mobile station automatically increases the transmission power level by the power level $P_a$ and transmits data to the base station at a transmission power level $(P_0+P_a)$.

[S15] The base station transmits a message including an instruction for increasing the transmission power level by a power level $P_b$ to the mobile station.

[S16] The mobile station further increases the transmission power level by the power level $P_b$ and transmits data to the base station at a transmission power level $(P_0+P_a+P_b)$.

Thus, in the open-loop control, when a mobile station detects the reduction in receiving level of a base station, the mobile station automatically adjusts a transmission power level. However, even in the open-loop control, when the mobile station receives a power control instruction from the base station like in operation S15, the mobile station adjusts the transmission power level in accordance with the received instruction.

Next, a transmission power control operation performed by the radio communication apparatus 10 will be described in detail. The transmission power control operation includes a first phase and a second phase.

In the first phase, for example, when the radio communication apparatus 10 receives no response to a Ranging from a base station, the radio communication apparatus 10 performs a retry at substantially the same power level as that at the time of the initial transmission of the Ranging. Alternatively, the radio communication apparatus 10 performs substantially the same transmission power level calculation as that made at the time of the initial transmission of the Ranging again and performs a retry at the calculated transmission power level. In the second phase, for example, when the radio communication apparatus 10 receives no response from the base station after performing the retry in the first phase, the radio communication apparatus 10 variably increases the transmission power level.

It is assumed that the radio communication apparatus 10 cannot receive a response to a transmitted Ranging from a base station within a specified period. At that time, for example, when the radio communication apparatus 10 performs the closed-loop control, the radio communication apparatus 10 keeps substantially the same transmission power level as at the time of the initial transmission of the Ranging. Subsequently, the radio communication apparatus 10 performs an operation similar to that performed when the radio communication apparatus 10 receives no instruction concerning transmission power from the base station, and performs the retry of the Ranging at substantially the same power level as that at the time of the initial transmission of the Ranging (first phase).

On the other hand, for example, when the radio communication apparatus 10 performs the open-loop control, the radio communication apparatus 10 performs substantially the same transmission power level calculation as that made at the time of the initial transmission of the Ranging and performs the retry of the Ranging at the calculated transmission power level (first phase). Thus, in the first phase, one of the above-described two operations is performed in accordance with the type of loop control, the closed-loop control or the open-loop control.

When the radio communication apparatus 10 receives no response to the Ranging from the base station after performing the above-described retry in the closed-loop control or the open-loop control in the first phase, the radio communication apparatus 10 increases the transmission power level and performs a retry at the increased transmission power level (second phase). In the second phase, even in the case of the closed-loop control, the radio communication apparatus 10 increases the transmission power level without waiting for an instruction from the base station.

Thus, when the radio communication apparatus 10 receives no response to a Ranging from the base station owing to a transient factor (temporary interference, the temporary disturbance of a radio wave, or unsuccessful receiving in the base station due to the temporary increase in processing load on the base station) and performs a retry in the first phase, a transmission power parameter is not changed.

Accordingly, when the temporary disconnection factor is reduced or eliminated, it is probable that a Ranging will reach the base station at substantially the same power level as that at the time of the initial transmission of the Ranging or the power level determined in accordance with a power control protocol at the time of the initial transmission of the Ranging. The transmission power level can be therefore reduced or prevented from being excessive when communication is restarted.

Even when there is a shortage of transmission power in the first phase, the transmission power is increased by the retry operation in the second phase. Accordingly, the disconnection between the radio communication apparatus 10 and the base station can be reduced or prevented and communication can be recovered to its normal state.

Figure 7:
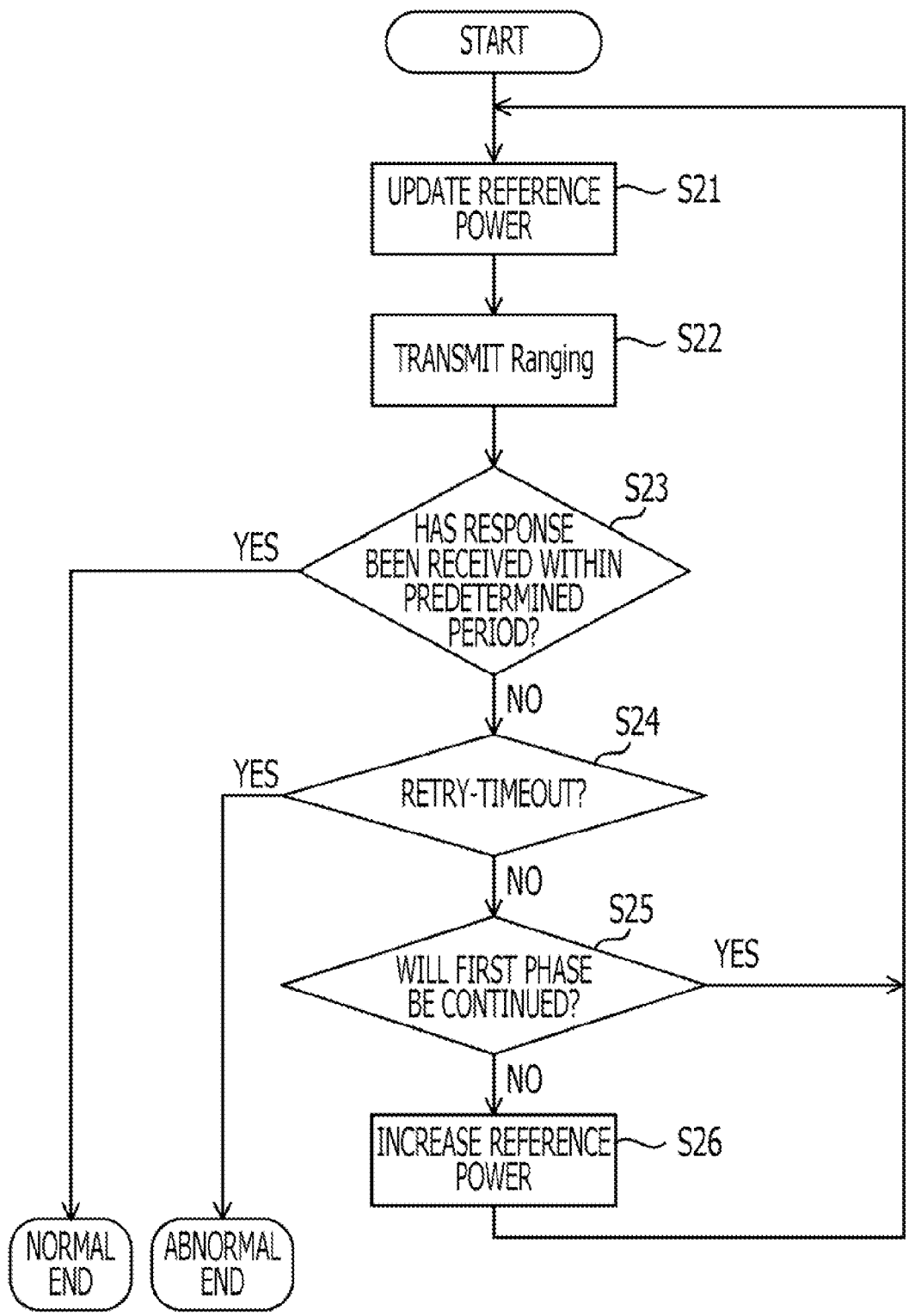
FIG. 7 is a flowchart illustrating a transmission power control process.

FIG. 7 is a flowchart illustrating a transmission power control process when the open-loop control is performed.

[S21] The transmission power control section 12 adjusts a reference transmission power level so as to compensate for the change in a radio wave loss between the radio communication apparatus 10 and a base station before transmitting a Ranging.

The radio communication apparatus 10 stores data of reference transmission power (that is not changed in accordance with a transmission format). The radio communication apparatus 10 calculates the change in RSSI as the change in a radio wave loss between the radio communication apparatus 10 and a base station, and updates the reference transmission power level by compensating for the change in RSSI.

That is, at the time of a retry, the radio communication apparatus 10 calculates the change in RSSI as the difference between a path loss at the time of initial transmission of a Ranging and a path loss at the time of retransmission of the Ranging and updates the reference transmission power level on the basis of the change in RSSI.

An equation for updating the reference transmission power level is as follows, where $P_{ref}$ denotes the reference transmission power level and $\Delta$RSSI denotes the change in RSSI.

$$P_{ref} = P_{ref} - \Delta\text{RSSI} \quad (1)$$

[S22] The transmission power control section 12 adjusts the amount of power for transmission of a Ranging, and the transmission section 11 transmits the Ranging to the base station.

In IEEE 802.16e, the amount of transmission power is adjusted for each type of modulation of a transmission signal. In this case, the amount of transmission power adjusted for transmission of a Ranging is added to reference transmission power. The reference transmission power is set for each subcarrier. Accordingly, when the number of transmission subcarriers is N, actual transmission power is obtained by multiplying the reference transmission power by N (in this case, since db calculation is performed, the values of N subcarriers are converted into values of dB and are then added). A Ranging is transmitted at the Ranging transmission power level calculated as above.

Ranging transmission power $P_{RNG}$ is obtained with the following equation (2), where $P_{OFS\ RNG}$ denotes the amount of power adjusted for transmission of a Ranging and $N_{RNG}$ denotes the number of subcarriers at the time of transmission of a Ranging.

$$P_{RNG} = P_{ref} + P_{OFS\ RNG} + 10\log_{10}(N_{RNG}) \quad (2)$$

[S23] The transmission power control section 12 waits for a response to the Ranging from the base station. When the transmission power control section 12 receives a response from the base station within a specified period, it is determined that the transmission of the Ranging has been successfully completed and a Ranging transmission process ends. When the transmission power control section 12 receives no response from the base station within the specified period, a timeout occurs and the process proceeds to operation S24.

[S24] The transmission power control section 12 checks the number of times of transmission of a Ranging (the number of retry timeouts). When the number of transmission times reaches a retry upper limit, it is determined that the transmission of a Ranging has been ended in failure. When there are any retries remaining, the process proceeds to operation S25.

[S25] It is determined whether the retry of a Ranging will be continued in the first phase. When it is determined that the first phase will be continued, the process returns to operation S21. When it is determined that the first phase will not be continued, the process proceeds to operation S26.

When the first phase will be continued, substantially the same calculation of the transmission power level as that performed at the time of the initial transmission of the Ranging is performed again, that is, Ranging transmission power $P_{RNG}$ is calculated again using equation (1) used in operation S21 and equation (2) used in operation S22, and the retry of a Ranging is performed at the calculated transmission power level.

In the first phase when the open-loop control is employed, a parameter such as $\Delta$RSSI may be changed. Accordingly, the recalculated transmission power level may be different from that calculated at the time of initial transmission of the Ranging. In the first phase when the closed-loop control is employed, the transmission power level calculated at the time of initial transmission of the Ranging is used.

[S26] The transmission power control section 12 increases the transmission power level by increasing the reference transmission power level and the process returns to operation S21. The reference transmission power level is calculated using the following equation (3), where $\Delta P_{RO}$ denotes the amount of increase in the reference transmission power.

$$P_{ref} = P_{ref} + \Delta P_{RO} \quad (3)$$

As described previously, in operations S21 and S22 in the first phase, the retry is performed at a transmission power level that has been determined in the same procedure as that at the time of the initial transmission of the Ranging. In the operations S26, S21, and S22 in the second phase, the transmission power level is variably increased by increasing the reference transmission power level and the retry is performed.

Accordingly, even if the base station cannot respond to a Ranging owing to a temporary factor (for example, unsuccessful receiving of a radio wave in the base station or the temporary loss of responsiveness due to the increase in processing load on the base station), the Ranging can be retransmitted at an appropriate transmission power level after the factor has been reduced or eliminated.

When the shortage of transmission power occurs, the retry is performed in the second phase. In the second phase, control processing in the related art for gradually increasing a fixed level set in advance is not performed. A reference level is increased and then a transmission power level is increased on the basis of the change in RSSI. As a result, it is possible to transmit a Ranging at an appropriate transmission power level at the time of occurrence of the transmission power shortage.

Next, embodiments of the present invention based on the transmission power control described with reference to FIG. 7 will be described. In the first embodiment, it is assumed that the closed-loop control is employed. When the radio communication apparatus 10 receives no response to a Ranging from a base station, it performs the retry of the Ranging at substantially the same transmission power level as that at the time of the initial transmission of the Ranging in the first phase. When the radio communication apparatus 10 cannot receive a response to the Ranging from the base station after performing the retry in the first phase, it calculates the transmission power level in consideration of the change in the path loss between the radio communication apparatus 10 and the base station and performs a retry at the calculated transmission power level in the second phase.

In the transmission power control according to the first embodiment, the second phase may start at the time of the first retry after the initial transmission of a Ranging has been ended in failure, that is, the transmission power level may be increased each time the retry is performed.

In this case, even if the path loss between the radio communication apparatus 10 and the base station is abruptly changed, it is possible to flexibly control transmission power. Accordingly, even in a case where a base station cannot receive a Ranging owing to the abrupt change in the path loss and cannot transmit a power control instruction to the radio communication apparatus 10, it is possible to keep an appropriate receiving power level in the base station.

Next, a second embodiment of the present invention will be described. In the second embodiment, at the time of the first retry, a first-phase operation is performed. When the number of retries reaches a specified number in the first phase, the phase is shifted from the first phase to the second phase.

Figure 8:
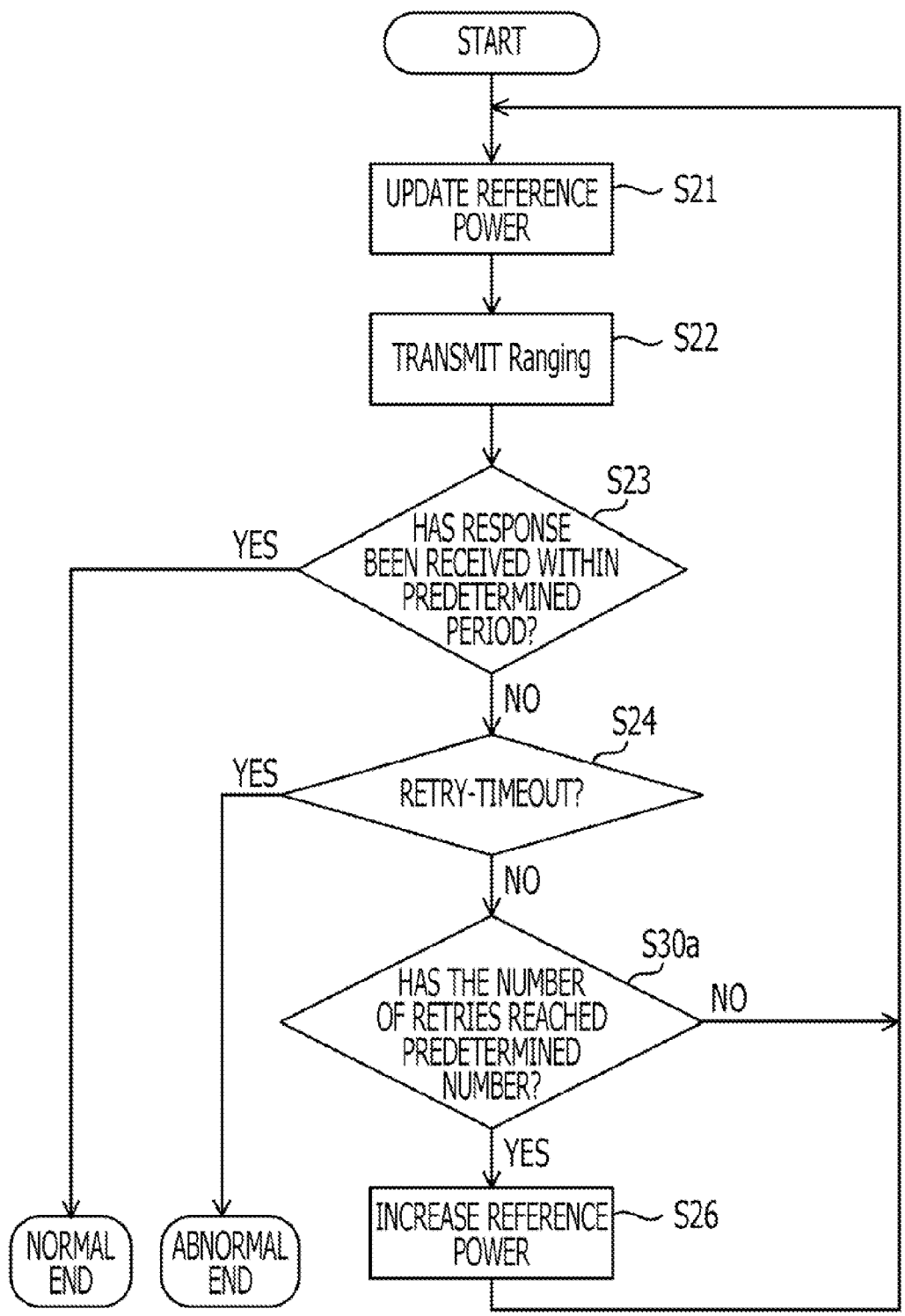
FIG. 8 is a flowchart illustrating a transmission power control process.

FIG. 8 is a flowchart illustrating a transmission power control process according to the second embodiment. In FIG. 8, the same reference numerals are used to identify operations already described with reference to FIG. 7, and the description thereof will be therefore omitted. In the second embodiment, operation S30a is added in which the number of retries is determined.

[S30a] When there are any retries remaining, the transmission power control section 12 determines whether the number of retries in the first phase has reached a specified number. When the number of retries has not reached the specified number, the process returns to operation S21 in which the retry is performed in the first phase. When the number of retries has reached the specified number, the process proceeds to operation S26 in which the phase is shifted from the first phase to the second phase.

By shifting the phase from the first phase to the second phase when the number of retries reaches a specified number in the first phase as described previously, it is possible to variably set the retry period in the first phase in accordance with the state of radio communication between the radio communication apparatus 10 and a base station and keep an appropriate transmission power level.

Next, the third embodiment will be described. The first-phase transmission power control is continued when there is no response to a Ranging from a base station after the connection between the radio communication apparatus 10 and the base station has been established or transmission power for the base station has been controlled.

In the WiMAX protocol specification, there are a plurality of types of Ranging transmission including the Initial Ranging, the Periodic Ranging, and the BW Ranging.

The Initial Ranging is an initial procedure for establishing the connection to a base station. When the radio communication apparatus 10 has yet to recognize an appropriate receiving power level for the base station, it gradually increases a transmission power level from a low level.

In the Periodic Ranging, the radio communication apparatus 10 periodically transmits a Ranging so as to notify the base station that the radio communication apparatus 10 is present within communication distance of the base station. In the BW Ranging, the radio communication apparatus 10 transmits a Ranging so as to be assigned with a communication slot by the base station before transmitting information to the base station.

Since the Periodic Ranging and the BW Ranging are performed after the connection between the radio communication apparatus 10 and a base station has been established, the radio communication apparatus 10 has already recognized an appropriate receiving power level for the base station (a level at which transmission to the base station is performed).

In the third embodiment, it is determined whether the radio communication apparatus 10 has already recognized an appropriate receiving power level for a base station, and a retry is performed in the first phase or the second phase in accordance with a result of the determination.

That is, in the Initial Ranging in which the connection between the radio communication apparatus 10 and a base station is not established, a retry is performed in the second phase. In the Periodic Ranging and the BW Ranging in which the connection between the radio communication apparatus 10 and a base station is established, a retry is performed in the first phase.

Figure 9:
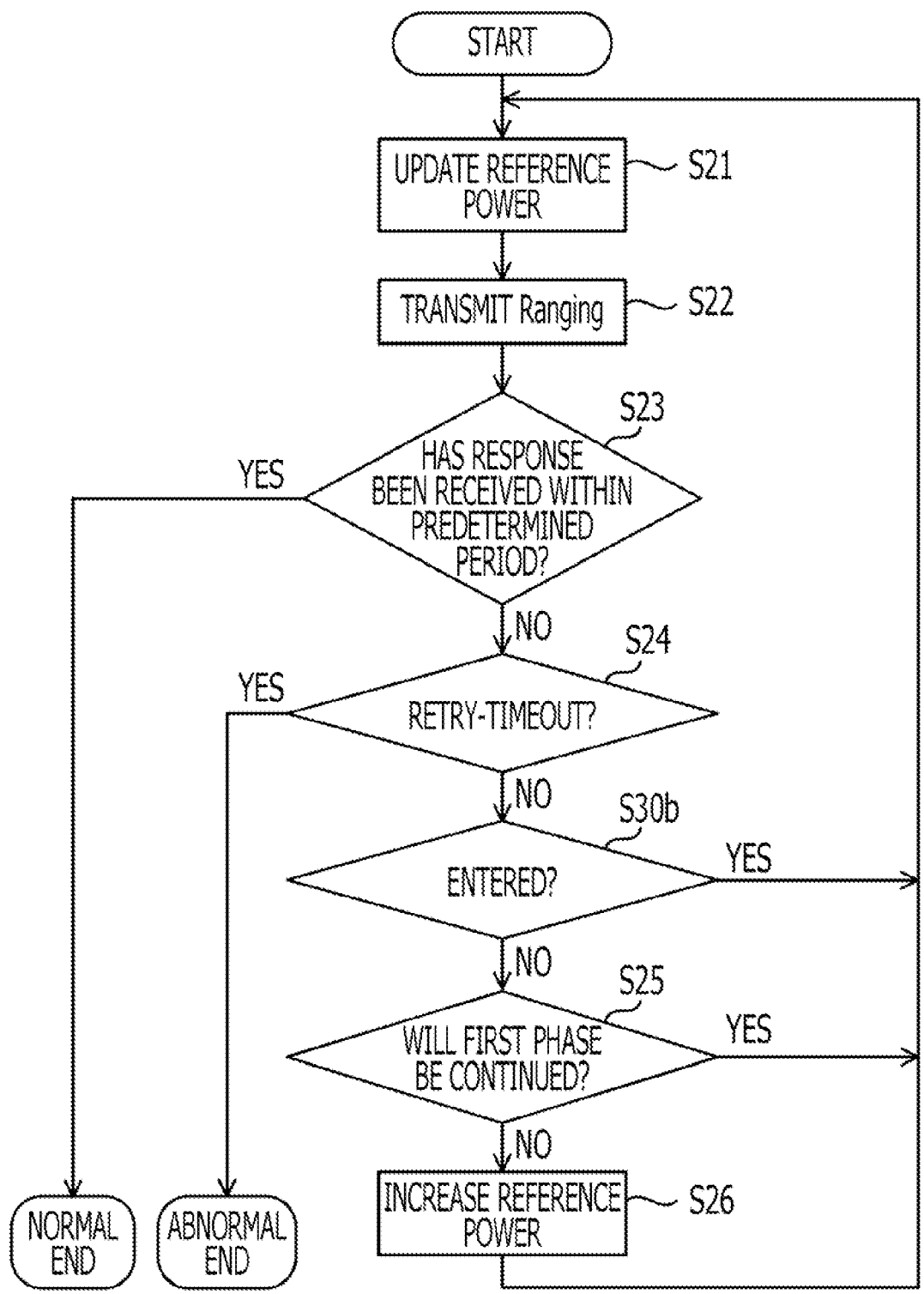
FIG. 9 is a flowchart illustrating a transmission power control process.

FIG. 9 is a flowchart illustrating a transmission power control process according to the third embodiment. In FIG. 9, the same reference numerals are used to identify operations already described with reference to FIG. 7, and the description thereof will be therefore omitted. In the third embodiment, operation S30b is added in which it is determined whether the radio communication apparatus 10 has entered a network.

[S30b] When there are any retries remaining, the transmission power control section 12 determines whether the radio communication apparatus 10 has entered a network covered by a base station, that is, determines whether the connection between the radio communication apparatus 10 and the base station has been established.

It is determined that the radio communication apparatus 10 has entered the network, the process returns to operation S21 in which the retry is performed in the first phase. It is determined that the radio communication apparatus 10 has not entered the network, the process proceeds to operation S25 in which it is determined whether the first phase will be continued. When it is determined that the first phase will not be continued, the process proceeds to operation S26 in which the phase is shifted from the first phase to the second phase.

By repeatedly performing a retry in the first phase after the connection to a base station has been established as described previously, it is possible to reduce or prevent a phenomenon where an adjusted transmission power level is changed.

Next, a fourth embodiment of the present invention will be described. In the third embodiment, when the radio communication apparatus 10 is connected to a base station and the Periodic Ranging or the BW Ranging is performed, the first phase is continued.

On the other hand, when a certain period has elapsed from the last transmission of a Ranging, a radio environment may have been significantly changed. In this case, it is probable that an appropriate transmission power level adjusted for the base station has been changed and the factor of the retry is power shortage.

Accordingly, in the fourth embodiment, when there is no response from a base station within a specified period from the last transmission of a Ranging, the phase is shifted to the second phase even in the case of the Periodic Ranging or the BW Ranging.

Figure 10:
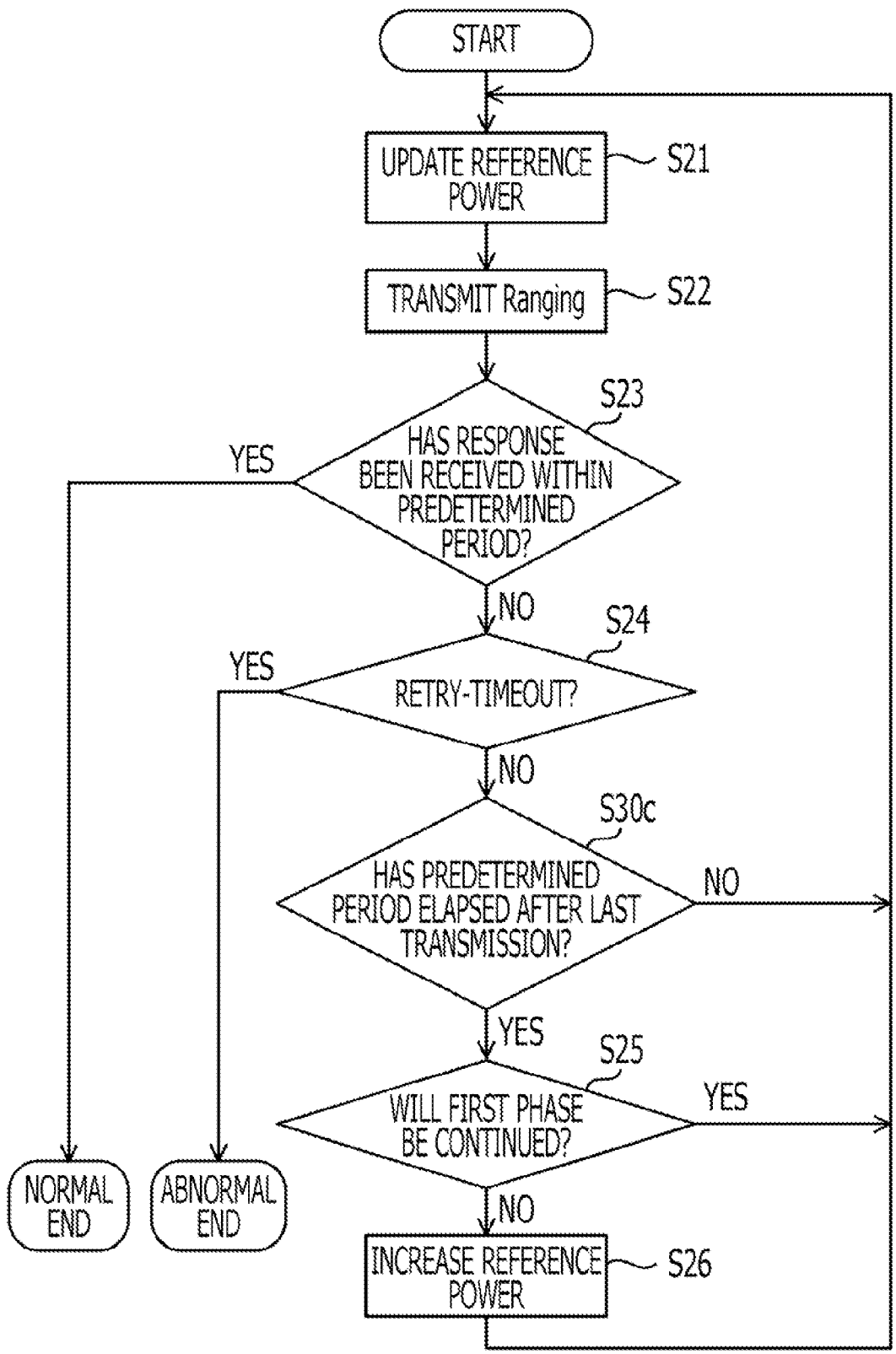
FIG. 10 is a flowchart illustrating a transmission power control process.

FIG. 10 is a flowchart illustrating a transmission power control process according to the fourth embodiment. In FIG. 10, the same reference numerals are used to identify operations already described with reference to FIG. 7, and the description thereof will be therefore omitted. In the fourth embodiment, operation S30c is added in which it is determined whether a specified period has elapsed from the last retry of a Ranging.

[S30c] When there are any retries remaining, the transmission power control section 12 determines whether a specified period has elapsed from the last retry of a Ranging. When it is determined that the specified period has not elapsed, the process returns to operation S21 in which a retry is performed in the first phase. When it is determined that the specified period has elapsed, the process proceeds to operation S25 in which it is determined whether the first phase will be continued. When it is determined that the first phase will not be continued, the process proceeds to operation S26 in which the phase is shifted from the first phase to the second phase.

Thus, when there is no response from a base station within a specified period from the last transmission of a Ranging, the phase is shifted to the second phase even in the case of the Periodic Ranging or the BW Ranging. As a result, the transmission of a Ranging is performed at an appropriate transmission power level.

Next, a fifth embodiment of the present invention will be described. In the fifth embodiment, the shift from the first phase to the second phase is performed in accordance with the degree of change in radio wave environment. In an unstable state of a radio wave environment between the radio communication apparatus 10 and a base station, it is probable that the temporary shortage of transmission power occurs even if the transmission of a Ranging is performed at an adjusted transmission power level.

When a transmission power level is increased immediately after a radio wave environment has been changed, it is probable that transmission power becomes too high. Accordingly, when the value of the change in a radio wave environment does not exceed a threshold value, the first phase is continued and the number of retries is increased. As a result, it is possible to reduce or prevent an inappropriate increase in the transmission power level.

Figure 11:
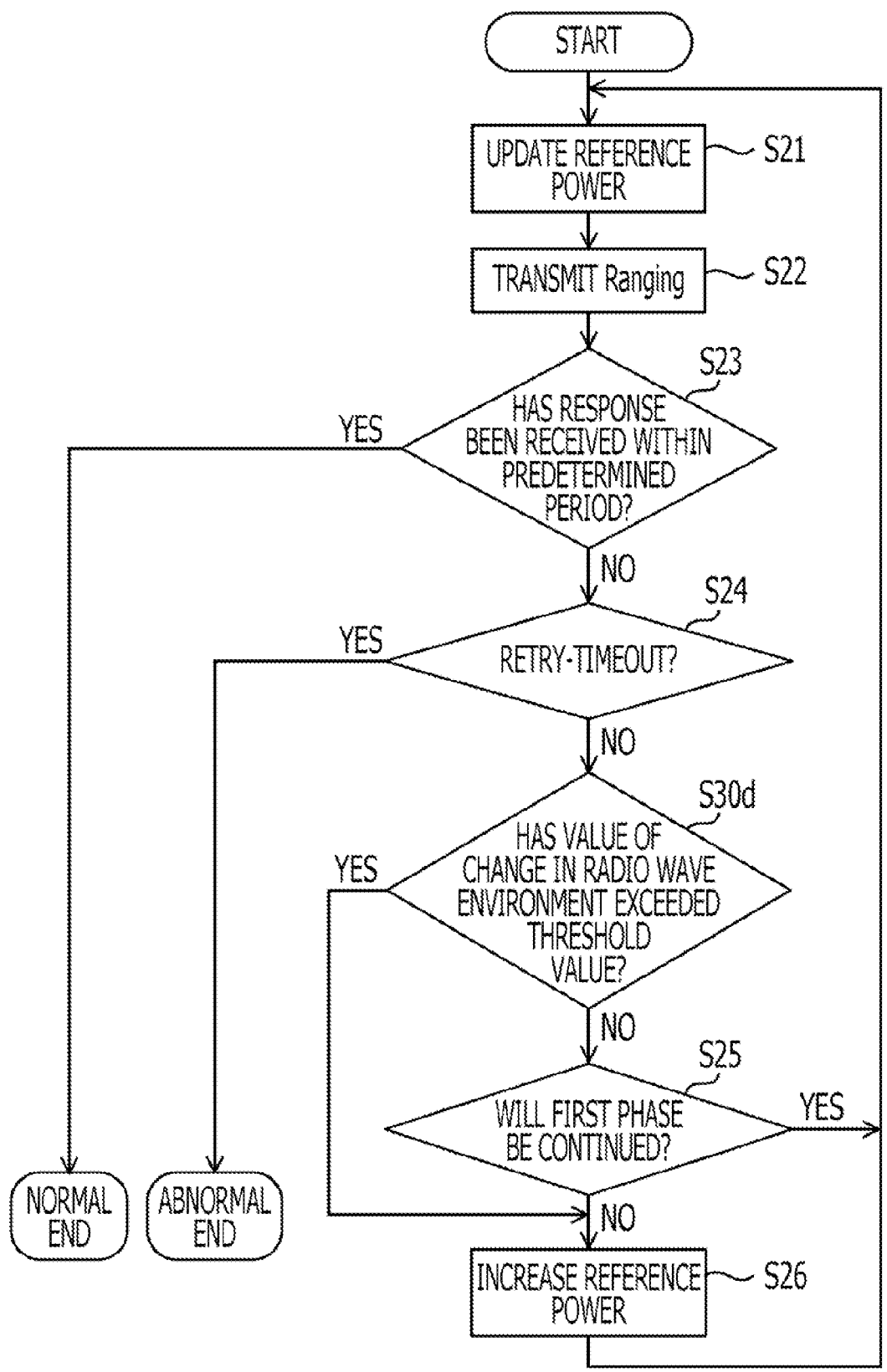
FIG. 11 is a flowchart illustrating a transmission power control process.

FIG. 11 is a flowchart illustrating a transmission power control process according to the fifth embodiment. In FIG. 11, the same reference numerals are used to identify operations already described with reference to FIG. 7, and the description thereof will be therefore omitted. In the fifth embodiment, operation S30d is added in which it is determined whether the amount of change in a radio wave environment from the last retry of a Ranging is large.

[S30d] When there are any retries remaining, the transmission power control section 12 determines whether the degree of change in a radio wave environment from the last retry of a Ranging has exceeded a threshold value. When it is determined that the degree of change in the radio wave environment has not exceeded the threshold value, it is determined that a temporary change in a radio wave has occurred and the process proceeds to operation S25. In operation S25, it is determined whether the first phase will be continued. When it is determined that the first phase will be continued, the process returns to operation S21 in which the first phase is continued. On the other hand, when it is determined that the degree of change in the radio wave environment continues to exceed the threshold value for a specified period, the process proceeds to operation S26 in which the phase is shifted from the first phase to the second phase.

The degree of change in the radio wave environment is detected by detecting how a radio wave receiving level in a base station (RSSI) and the Carrier to Interference-plus-Noise Ratio (CINR) are changed, and threshold values are set for RSSI and CINR in advance.

By determining whether the change in the radio wave environment is a temporary change as described previously, it is possible to perform the retry of a Ranging at an appropriate transmission power level in accordance with the state of communication between the radio communication apparatus 10 and a base station.

Next, an example case in which a mobile station for performing WiMAX (IEEE 802.16e) communication has the function of the radio communication apparatus 10 will be described. A transmission power level at the time of the initial transmission of a Ranging is calculated with the following equation (4).

$$P_{TX\,IR\,MAX} = E_{IRxP\,IR,max} + BS_{EIRP} - \text{RSSI} \quad (4)$$

In equation (4), $E_{IRxP\,IR,\,max}$ and $BS_{EIRP}$ denote the Initial Ranging maximum equivalent isotropic received power and effective isotropic radiated power, respectively, which are steadily broadcasted from a base station to a terminal.

Figure 12:
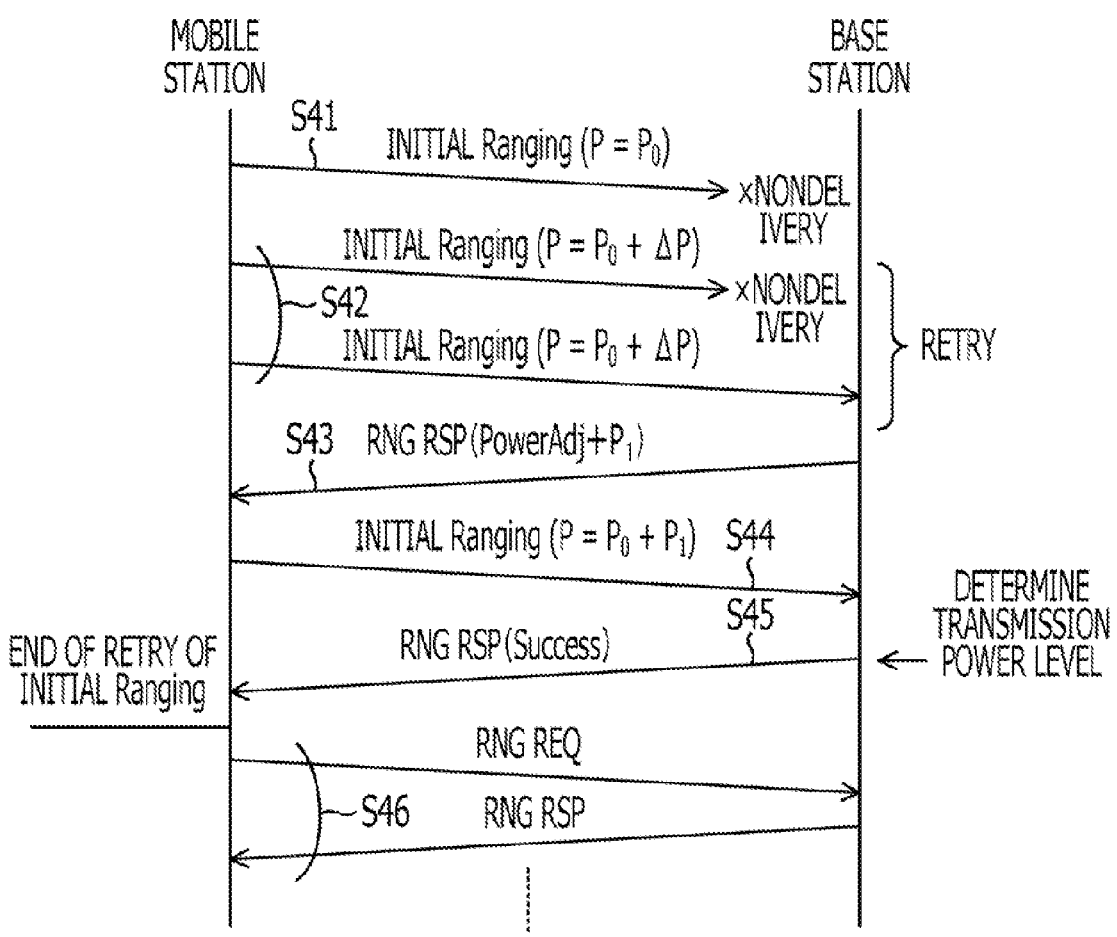
FIG. 12 is a sequence diagram illustrating an example initial Ranging transmission process.

FIG. 12 is a sequence diagram illustrating an example initial Ranging transmission process.

[S41] A mobile station transmits an initial Ranging to a base station at a transmission power level $P_0$, but the base station does not receive the initial Ranging.

[S42] Since the mobile station receives no response from the base station, it increases the transmission power level and performs the retry of the initial Ranging at the increased transmission power level ($P_0 + \Delta P$). It is assumed that the base station receives the initial Ranging from the mobile station at the second retry.

[S43] The base station transmits an RNG RSP message (Ranging response) including an instruction for setting the transmission power level ($P_0 + P_1$) to the mobile station.

[S44] The mobile station transmits the initial Ranging at the transmission power level ($P_0 + P_1$).

[S45] The base station transmits an RNG RSP message to the mobile station so as to notify the mobile station that the base station has successfully received the initial Ranging as an access request.

[S46] The mobile station transmits an RNG REQ message (Ranging request) to the base station. The base station transmits an RNG RSP message to the mobile station.

In the case of the Periodic Ranging and the BW Ranging, a Ranging is transmitted after a transmission power level has been determined. Accordingly, power control is performed using the following equation for the closed-loop control or the following equation for the open-loop control. In the following equations, a subscript new and a subscript last denote current transmission and the last transmission, respectively.

In the closed-loop control, the following equation (5) is used.

$$P_{new}=P_{last}+(C/N_{new}-C/N_{last})-(10\log_{10}(R_{new})-10\log_{10}(R_{last}))+\text{Offset} \quad (5)$$

Each parameter is defined as follows.
$P_{new}$=a power of a new UL (up link) burst in a current UL frame
$C/N_{new}$=normalized C/N for the new UL burst in the current UL frame
$R_{new}$=repetition factor R for the new UL burst in the current UL frame
$P_{last}$=a power of a burst with a maximum value of (C/N−10 $\log_{10}$ (R)) in the most recently transmitted UL frame
$C/N_{last}$=normalized C/N associated with $P_{last}$ (thus referring to the burst with the maximum value of (C/N−10 $\log_{10}$ (R)) in the most recently transmitted UL frame)
$R_{last}$=repetition factor R associated with $P_{last}$ (thus referring to the burst with the maximum value of (C/N−10 $\log_{10}$ (R)) in the most recently transmitted UL frame)
Offset=an accumulation of power correction terms sent by BS (base station) since the last transmission In equation (5), C/N denotes a noise level normalized on the basis of a modulation method, and R denotes repetition. Here, when a reference modulation method is virtually determined, the following equations are obtained.

$$PR_{new}=PR_{last}+\text{Offset} \quad (6)$$

$$P_{new}=PR_{new}+(C/N_{new}-C/NR)-(10\log_{10}(R_{new})-10\log_{10}(RR))+\text{Offset} \quad (7)$$

As is apparent from the above-described equations, the amount of adjustment of power including the amount of boost determined in accordance with a modulation method is added to power for each subcarrier determined regardless of a modulation method (in a control process called Option 2).

On the other hand, in the open-loop control, the following equation (8) is used.

$$P(\text{dBm})=L+C/N+NI-10\log_{10}(R)+\text{Offset }SS(\text{subscriber station})per SS+\text{Offset }BSperSS \quad (8)$$

Each parameter is defined as follows.
P=TX power level (dBm) per a subcarrier for the current transmission, including MS Tx antenna gain
L=an estimated average current UL propagation loss
NI=an estimated average power level (dBm) of a noise and interference per a subcarrier at BS, not including BS Rx antenna gain
Offset SSperSS=a correction term for SS-specific power offset
Offset BSperSS=a correction term for SS-specific power offset In equation (8), power for each subcarrier is determined in consideration of a modulation method, a path loss, and a fixed offset.

When the following modified equation (9) is obtained, it is possible to determine reference power PR independent of a modulation method and set a relative level to the reference power PR as power for each burst dependent on the modulation method.

$$PR_{new}+PR_{last}+(L_{new}-L_{last})=PR_{last}-(RSSI_{new}-RSSI_{last}) \quad (9)$$

In the Initial Ranging, since an appropriate transmission power level has yet to be obtained, control processing is performed for searching for a power level at which a response from a base station can be obtained. In the Periodic Ranging and the BW Ranging, after a transmission power level has been determined, one of the closed-loop control and the open-loop control is selected in accordance with an instruction from the base station and the selected control processing is performed. Accordingly, the above-described retry is performed in the Periodic Ranging and the BW Ranging.

Next, example application of the radio communication apparatus 10 to a communication interface module or an adapter will be described. The radio communication apparatus 10 can be applied not only to a mobile telephone but also a communication interface module or an adapter connectable to various communication terminals.

For example, the communication interface module or the adapter can cause a personal computer, a hand-held terminal, or the like to function as a radio terminal when it is connected to the extended interface of the personal computer, the hand-held terminal, or the like, and can achieve a function according to an embodiment of the present invention when it is connected to various communication terminals.

More specifically, the radio communication apparatus 10 can be applied to a communication interface module or an adapter that includes a Universal Serial BUS (USB) I/F and a radio I/F unit connected to a terminal body via a USB and can cause a personal computer, a PDA, or the like having an USB I/F to function as a radio terminal when it is connected to the personal computer, the PDA, or the like.

Figure 13:
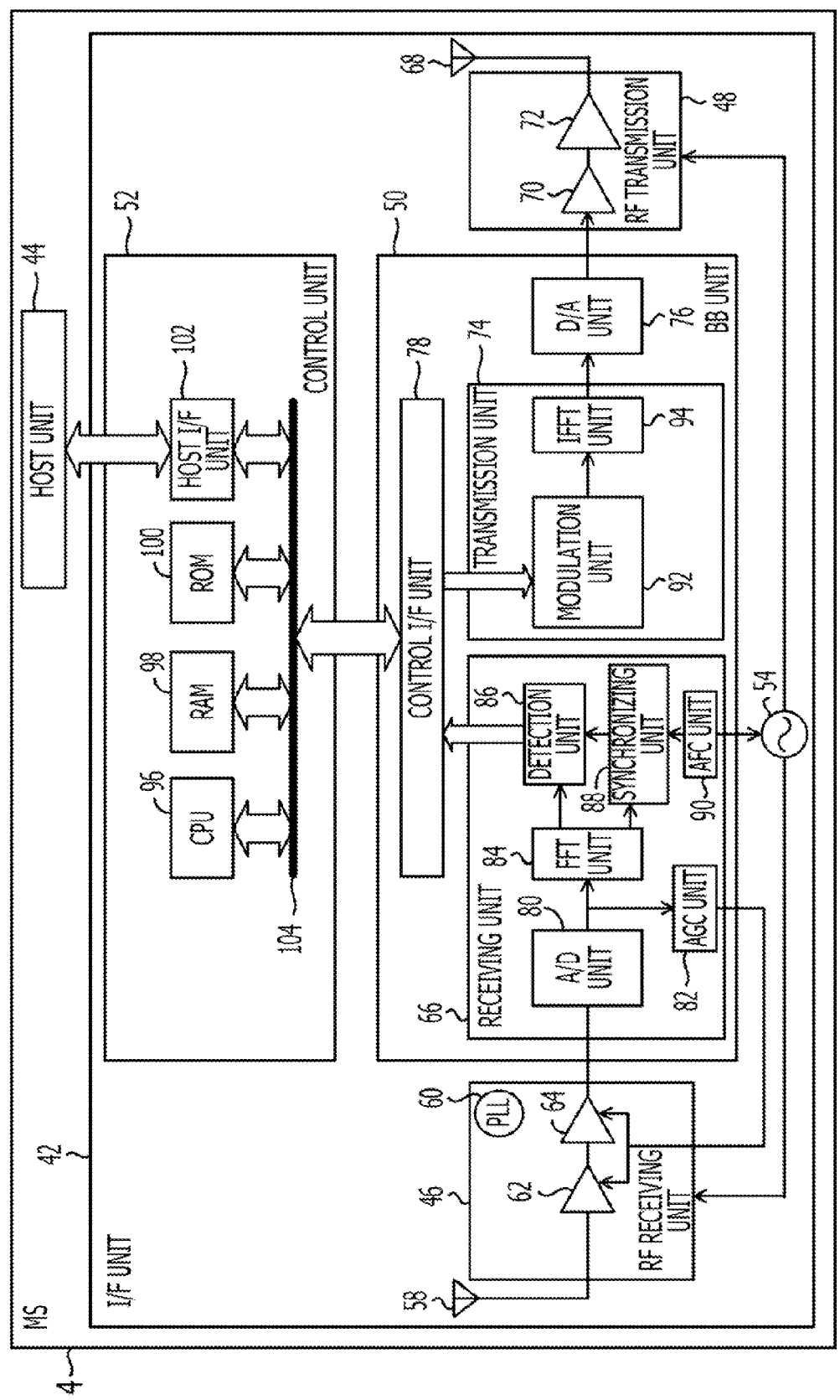
FIG. 13 is a diagram illustrating an example configuration of a radio terminal.
Figure 14:
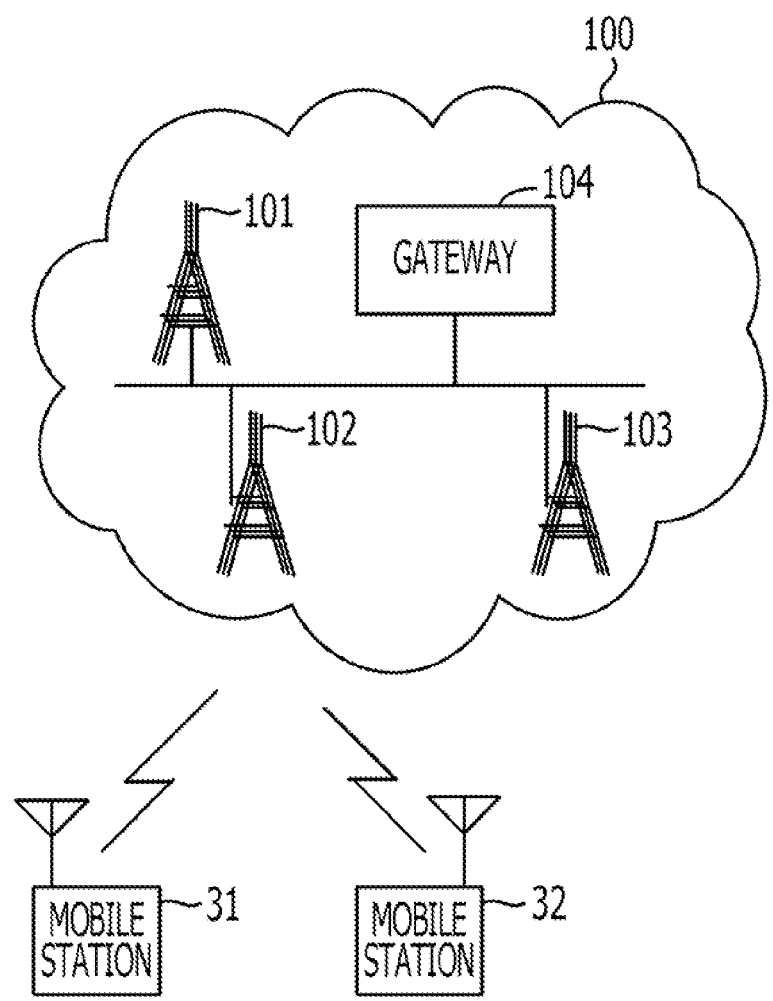
FIG. 14 is a diagram illustrating a WiMAX radio network.

Next, the configuration of a radio terminal (MS) to which the radio communication apparatus 10 is applied will be described. FIG. 13 is a diagram illustrating an example configuration of a radio terminal. A MS4 includes an interface (I/F) section 42 and a host section 44 that are used for wireless connection to a base station. The I/F section 42 is an example of a radio communication module having a function of transmitting/receiving a radio wave to/from a base station. The host section 44 is a control section for the I/F section 42, and is a computer.

The I/F section 42 includes a radio frequency (RF) receiving unit 46, a radio frequency (RF) transmission unit 48, a baseband (BB) unit 50, a control unit 52, an oscillation unit 54, and a temperature detection unit 56 (not illustrated). The RF receiving unit 46 includes a receiving antenna 58, and receives a signal from, for example, a base station. The RF receiving unit 46 has a function of amplifying a high frequency in a received signal and a received frequency tuning function. In order to achieve the functions, an oscillation signal is supplied from the oscillation unit 54 to the RF receiving unit 46.

A phase locked loop (PLL) 60 that is a frequency synthesizer is provided so as to tune a frequency to a received frequency. Amplifiers 62 and 64 are provided so as to amplify a received signal. The gains of the amplifiers 62 and 64 are controlled with a gain control signal output from a receiving unit 66.

The RF transmission unit 48 generates a transmission output signal so as to transmit a signal output from the BB unit 50, and transmits the transmission output signal from a transmission antenna 68 to a base station. The RF transmission unit 48 has an output amplification function so as to output a transmission signal. In order to achieve this function, an oscillation signal is supplied from the oscillation unit 54 to the RF transmission unit 48. Amplifiers 70 and 72 are provided so as to amplify a transmission signal.

The BB unit 50 performs data processing for detecting, dividing, and reconstructing a data transmission packet and signal processing including modulation, digital-to-analog (D/A) conversion, and analog-to-digital (A/D) conversion. The BB unit 50 includes the receiving unit 66, a transmission unit 74, a D/A unit 76, and a control interface (I/F) unit 78.

The receiving unit 66 includes an A/D unit 80, an automatic gain control (AGC) unit 82, a fast Fourier transform (FFT) unit 84, a detection unit 86, a synchronizing unit 88, and an automatic frequency control (AFC) unit 90.

The A/D unit 80 in the receiving unit 66 converts a signal received by the RF receiving unit 46 into a digital signal. The AGC unit 82 detects the level of the received signal from the digital signal transmitted from the A/D unit 80 and generates an AGC signal on the basis of the detected level. The AGC signal is transmitted to the amplifiers 62 and 64 in the RF receiving unit 46 and is used to control the gains of the amplifiers 62 and 64.

The FFT unit 84 is a signal processing unit for performing fast Fourier transform on the digital signal transmitted from the A/D unit 80 and extracts a frequency component included in the digital signal. The detection unit 86 detects a packet signal from the frequency component extracted by the FFT unit 84 and outputs the packet signal to the control I/F unit 78. The synchronizing unit 88 obtains synchronization with the detection unit 86 and the AFC unit 90 using the frequency component extracted by the FFT unit 84. The AFC unit 90 controls the oscillation frequency of the oscillation unit 54 using the frequency component extracted by the FFT unit 84 so as to cause the oscillation unit 54 to oscillate at a specified oscillation frequency.

The transmission unit 74 includes a modulation unit 92 and an inverse fast Fourier transform (IFFT) unit 94. The modulation unit 92 receives a data signal from the control I/F unit 78 and performs digital modulation on a carrier wave. The IFFT unit 94 performs inverse fast Fourier transform on a signal output from the modulation unit 92 and generates a digital transmission signal.

The D/A unit 76 converts the digital transmission signal generated by the IFFT unit 94 into an analog signal and transmits the analog signal to the RF transmission unit 48. The RF transmission unit 48 converts the transmission signal into a transmission output signal and transmits the transmission output signal from the transmission antenna 68.

The control I/F unit 78 is an interface between the control unit 52 and each of the receiving unit 66 and the transmission unit 74. The control I/F unit 78 transmits a packet data signal or the like received from the receiving unit 66 to the control unit 52, or transmits a signal received from the control unit 52 to the transmission unit 74.

The control unit 52 controls the BB unit 50. In addition, the control unit 52 transmits a scanning request to, for example, a base station BS6 and performs various controls including the termination of transmission/receiving processing in accordance with a scanning instruction that has been transmitted from the base station BS6 in response to the scanning request. The control unit 52 includes a central processing unit (CPU) 96, a random-access memory (RAM) 98, a read-only memory (ROM) 100, and a host interface (I/F) unit 102 that are connected to one another via a bus 104.

The CPU 96 is an example of a processor for performing control processing and computation processing, and executes a program stored in the ROM 100 or a program loaded from the ROM 100 into the RAM 98. For example, the above-described termination of transmission/receiving processing is a part of processing included in a program.

The RAM 98 is an example of a readable/writable storage unit. The RAM 98 functions as a work area for a program executed by the CPU 96, or stores a program loaded from the ROM 100 thereinto. The ROM 100 is a storage unit such as a flash memory for storing a program or data, and stores a program executed by the CPU 96 and various pieces of table data.

The host I/F unit 102 is an interface between the control unit 52 and the host unit 44. The oscillation unit 54 oscillates at a specified frequency controlled in accordance with a signal output from the receiving unit 66 and outputs an oscillation signal to the RF receiving unit 46 and the RF transmission unit 48.

Next, a software program for performing the function of the radio communication apparatus 10 will be described. The above-described processing function of the radio communication apparatus 10 may be achieved by a computer. In this case, a program (transmission power control program) in which the processing details of a function required for the radio communication apparatus 10 are written is provided for the computer. The computer executes the program, so that the above-described processing function can be achieved on the computer. The program in which the processing details are written can be stored in a computer readable recording medium.

The computer is controlled by a CPU. A random-access memory (RAM), a hard disk drive (HDD), a communication interface, a graphic processing device, and an input/output interface are connected to the CPU via a bus.

The RAM temporarily stores an operating system (OS) program executed by the CPU and at least part of a transmission power control program. In addition, the RAM stores various pieces of data for processing performed by the CPU. The HDD stores an OS and an application program.

The communication interface is connected to a network. The communication interface transmits/receives data to/from another computer via the network. The graphic processing device to which a monitor is connected displays an image on the screen of the monitor in accordance with a command transmitted from the CPU.

The input/output interface to which a keyboard and a mouse are connected transmits a signal from the keyboard or the mouse to the CPU via the bus. The input/output interface is connectable to an external storage medium interface capable of writing/reading information in/from an external storage medium.

The radio communication apparatus 10 can be achieved by causing the computer to execute a program in which processing details of a function required for the transmission power control unit 12 are written. That is, processing details corresponding to the transmission power control unit 12 illustrated in FIG. 1 are written as a program. The written program can be stored in a computer readable recording medium.

The computer readable recording medium is a magnetic recorder such as an HDD, a flexible disk (FD), or a magnetic tape, an optical disc such as a DVD, a DVD-RAM, or a CD-ROM/RW, a magneto-optical recording medium such as a Magneto-Optical disc (MO), or a semiconductor memory.

For example, when the program is distributed, portable recording media with the program recorded thereon, such as DVDs or CD-ROMs, are sold. Alternatively, the program may be stored in the storage unit of a server computer, and may be transferred via a network from the server computer to other computers.

At least part of the above-described processing function may be achieved by an electronic circuit such as a Digital Signal Processor (DSP), an Application Specific Integrated Circuit (ASIC), or a Programmable Logic Device (PLD).

A computer for executing the program, for example, stores the program recorded on an external storage medium or transmitted from the server computer in its own storage unit. The computer reads the program from its own storage unit and performs processing in accordance with the program. The computer may read the program directly from the external storage medium and perform processing in accordance with the program. Alternatively, each time the program is transferred from the server computer to the computer, the computer may perform processing in accordance with the received program.

As described previously, according to an embodiment of the present invention, the probability that communication between a radio communication apparatus and a base station is restarted after the retry of a Ranging has been performed can be increased. As a result, the occurrence of a non-communication area and the occurrence of interruption of communication due to disconnection from a base station can be suppressed.

In the above-described embodiments, transmission power control performed by the radio communication apparatus 10 compliant with the WiMAX protocol has been described. However, the radio communication apparatus 10 may be compliant with another radio communication protocol.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiment(s) of the present invention(s) has(have) been described in detail, it should be understood that the various changes, substitutions, and alterations could be made hereto without departing from the spirit and scope of the invention.

What is claimed is:

1. A radio communication apparatus comprising:
   a radio interface configured to transmit or receive a radio signal; and
   a processor configured to control the radio interface to transmit a Ranging signal to a base station with a first transmission power level and to retransmit, when a response to the Ranging signal is not received from the base station, the Ranging signal to the base station; wherein
   for retransmitting the Ranging signal, in a first retransmission phase, the processor controls the radio interface to retransmit the Ranging signal with the same transmission power level as the first transmission power level or with a transmission power level that is calculated in the same way as the first transmission power level,
   in a second retransmission phase, the processor controls the radio interface to retransmit the Ranging signal with a transmission power level that is increased by degrees, and
   the first retransmission phase is switched to the second retransmission phase, when a specified condition is satisfied.

2. The radio communication apparatus according to claim 1, wherein the processor is configured to calculate increase in the transmission power level on a basis of a change between a path loss at the time of the initial transmission of the Ranging signal from the radio communication apparatus to the base station and a path loss at the time of the retransmission of the Ranging signal.

3. The radio communication apparatus according to claim 1, wherein the processor is configured to shift a phase from the first phase to the second phase when a number of times of retransmission of the Ranging signal reaches a specified number in the first phase.

4. The radio communication apparatus according to claim 1, wherein the processor is configured to perform the retransmission of the Ranging signal in the second phase when a connection between the radio communication apparatus and the base station is not established, and to perform the retransmission of the Ranging signal in the first phase when the connection between the radio communication apparatus and the base station is established.

5. The radio communication apparatus according to claim 1, wherein, when the radio interface receives no response from the base station within a specified period after retransmitting the Ranging signal in the first phase, the processor is configured to retransmit the Ranging signal in the second phase.

6. The radio communication apparatus according to claim 1, wherein the transmission power control unit detects a degree of change in a radio wave environment, continues the retransmission of the Ranging signal in the first phase when a degree of change in the radio wave environment is substantially equal to or smaller than a threshold value, and performs the retransmission of the Ranging signal in the second phase when the degree of change in the radio wave environment is larger than the threshold value.

7. A transmission power control method of controlling a transmission power level comprising,
   transmitting a Ranging signal to a base station with a first transmission power level; and
   retransmitting the Ranging signal to the base station when a response to the Ranging signal is not received from the base station, wherein
   the retransmitting retransmits, in a first retransmission phase, the Ranging signal with the same transmission power level as the first transmission power level or with a transmission power level that is calculated in the same way as the first transmission power level,
   the retransmitting retransmits, in a second retransmission phase, the Ranging signal with a transmission power level that is increased by degrees, and
   the first retransmission phase is switched to the second retransmission phase, when a specified condition is satisfied.

8. The transmission power control method according to claim 7, wherein increase in the transmission power level is calculated on a basis of a change between a path loss at the time of the initial transmission of the Ranging signal from a radio communication apparatus to the base station and a path loss at the time of the retransmission of the Ranging signal.

9. The transmission power control method according to claim 7, wherein a phase is shifted from the first phase to the second phase when a number of times of retransmission of the Ranging signal reaches a specified number in the first phase.

10. The transmission power control method according to claim 7, wherein the retransmission of the Ranging signal in the second phase is performed when a connection between the radio communication apparatus and the base station is not established, and the retransmission of the Ranging signal in the first phase is performed when the connection between the radio communication apparatus and the base station is established.

11. The transmission power control method according to claim 7, wherein, when there is no response from the base station within a specified period after the Ranging signal has been retransmitted in the first phase, the Ranging signal is retransmitted in the second phase.

12. The transmission power control method according to claim 7, wherein a degree of change in a radio wave environment is detected, the retransmission of the Ranging signal in the first phase is continued when the degree of change in the radio wave environment is equal to or smaller than a threshold value, and the retransmission of the Ranging signal in the second phase is performed when the degree of change in the radio wave environment is larger than the threshold value.

* * * * *